(12) United States Patent  
Zhou et al.

(10) Patent No.: US 8,462,802 B2  
(45) Date of Patent: Jun. 11, 2013

(54) HYBRID WEIGHTED ROUND ROBIN (WRR) TRAFFIC SCHEDULING

(75) Inventors: Aibing Zhou, San Jose, CA (US); John Johnson, Los Altos, CA (US); Chang-Hong Wu, Saratoga, CA (US); David J. Ofelt, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 374 days.

(21) Appl. No.: 12/880,403

(22) Filed: Sep. 13, 2010

(65) Prior Publication Data

US 2012/0063313 A1    Mar. 15, 2012

(51) Int. Cl.
 *H04L 12/54* (2006.01)

(52) U.S. Cl.
 USPC ............................................. 370/412; 370/429

(58) Field of Classification Search
 USPC .................. 370/395.21, 412, 413, 415, 417, 370/422, 428, 429; 455/449, 456.5, 560, 455/561
 See application file for complete search history.

(56) References Cited

U.S. PATENT DOCUMENTS

| | | | | |
|---|---|---|---|---|
| 5,629,937 A * | 5/1997 | Hayter et al. | ................. | 370/233 |
| 5,771,234 A * | 6/1998 | Wu et al. | ........................ | 370/396 |
| 5,781,531 A * | 7/1998 | Charny | ......................... | 370/232 |
| 5,850,399 A * | 12/1998 | Ganmukhi et al. | ........... | 370/412 |
| 5,859,835 A * | 1/1999 | Varma et al. | ................... | 370/229 |
| 6,011,775 A * | 1/2000 | Bonomi et al. | ............... | 370/230 |
| 6,434,155 B1 * | 8/2002 | Jones et al. | .................... | 370/398 |
| 6,470,016 B1 * | 10/2002 | Kalkunte et al. | ......... | 370/395.41 |
| 6,490,264 B1 * | 12/2002 | Suzuki | .......................... | 370/338 |
| 6,661,797 B1 * | 12/2003 | Goel et al. | ............... | 370/395.21 |
| 6,765,905 B2 * | 7/2004 | Gross et al. | .................... | 370/389 |
| 6,829,218 B1 * | 12/2004 | Chen et al. | .................... | 370/230 |
| 6,917,590 B1 * | 7/2005 | Oliva | ............................. | 370/232 |
| 7,684,331 B2 * | 3/2010 | Chan et al. | .................... | 370/235 |
| 7,957,309 B1 * | 6/2011 | Wee et al. | ..................... | 370/252 |
| 2002/0075799 A1 * | 6/2002 | Bennett | ........................ | 370/229 |
| 2003/0119556 A1 * | 6/2003 | Khan et al. | .................... | 455/560 |
| 2004/0174881 A1 * | 9/2004 | Okubo | ........................ | 370/395.4 |
| 2004/0177087 A1 * | 9/2004 | Wu et al. | ...................... | 707/102 |
| 2004/0179535 A1 * | 9/2004 | Bertagna | ................. | 370/395.21 |
| 2005/0052997 A1 * | 3/2005 | Montes Linares | ............ | 370/230 |
| 2005/0243848 A1 * | 11/2005 | Yuan et al. | .................... | 370/412 |
| 2007/0073949 A1 * | 3/2007 | Fredrickson et al. | ......... | 710/243 |
| 2008/0175270 A1 * | 7/2008 | Kataria et al. | ................ | 370/468 |
| 2008/0317059 A1 * | 12/2008 | Seigneurbieux | .............. | 370/417 |
| 2009/0028095 A1 * | 1/2009 | Kish | ............................. | 370/328 |
| 2010/0278189 A1 * | 11/2010 | Soon | ............................. | 370/412 |
| 2010/0278190 A1 * | 11/2010 | Yip et al. | ...................... | 370/412 |

* cited by examiner

*Primary Examiner* — Michael Thier
*Assistant Examiner* — Prince A Mensah
(74) *Attorney, Agent, or Firm* — Harrity & Harrity, LLP

(57) ABSTRACT

A network device receives traffic associated with a network of intermediate network devices and user devices, classifies the received traffic, and allocates the classified traffic to traffic queues. The network device also schedules particular queued traffic, provided in the traffic queues and bound for particular intermediate network devices, using a hybrid weighted round robin (WRR) scheduler where the hybrid WRR scheduler schedules the particular queued traffic according to one of a 1-level WRR schedule, a 1.5 level WRR schedule, or a 2-level WRR schedule. The network device further provides the particular queued traffic to the particular intermediate network devices based on the scheduling of the hybrid WRR scheduler.

18 Claims, 11 Drawing Sheets

HYBRID WEIGHTED ROUND ROBIN (WRR) TRAFFIC SCHEDULING

BACKGROUND

Computing and communication networks typically include network devices, such as routers, firewalls, switches, or gateways, which transfer or switch data, such as packets, from one or more sources to one or more destinations. Network devices may operate on the packets as the packets traverse the network, such as by forwarding or filtering the packet-based network traffic.

A network device may schedule traffic for delivery to one or more destinations based on a variety of mechanisms. One scheduling mechanism is a weighted round robin (WRR) scheduler. In WRR scheduling, each packet flow or connection has its own packet queue in a network device. WRR scheduling is the simplest approximation of generalized processor sharing (GPS). While GPS serves infinitesimal amounts of data from each nonempty queue, WRR serves a number of packets for each nonempty queue. The WRR scheduling hierarchy is usually maintained in a tree structure with a root node at the top, leaf nodes at the bottom, and intermediate nodes in between. If the scheduling hierarchy has only one level (i.e., if there is no intermediate nodes between the root node and leaf nodes), it is called a 1-level (or "flat") WRR scheduling hierarchy. If the scheduling hierarchy has one level of intermediate nodes between the root node and leaf nodes, it is called a 2-level WRR scheduling hierarchy. In general, an N-level WRR scheduling hierarchy corresponds to a scheduling hierarchy that includes N−1 levels of intermediate nodes. A regular N-level WRR scheduler assigns a static weight to each node in the scheduling hierarchy (e.g., other than the root node) and each node (e.g., other than the root node) may maintain a running weight credit. A regular flat WRR scheduler maintains a running weight credit per leaf node of a tree structure which has no intermediate nodes.

A regular 2-level WRR scheduler maintains a running weight credit per leaf node and per intermediate node of a tree structure. An enqueue (Enq) thread traverses the tree structure bottom-up, a dequeue (Deq) thread traverses the tree structure top-down, and other threads may also be used by the 2-level WRR scheduler. The dequeue thread resolves a selected intermediate node first, performs a WRR across other intermediate nodes, moves to leaf nodes, and performs another WRR across the leaf nodes that are attached to the selected intermediate node. A leaf node may be allocated a bandwidth of: total_throughput×ratio_intermediate×ratio_leaf. The "total_throughput" may be a total throughput of a root node (e.g., of the tree structure). The "ratio_intermediate" may be a relative weight that indicates a percentage of the total throughput that may be allocated to an intermediate node. The "ratio_leaf" may be a relative weight that indicates a percentage of the total throughput (e.g., of a corresponding intermediate node) that may be allocated to a leaf node. All the weights for nodes may be statically configured.

Using a 2-level WRR scheduler, as opposed to a 1-level WRR scheduler, adds complexity to a scheduling mechanism. Besides the added complexity going from a 1-level WRR scheduler to a 2-level WRR scheduler, certain traffic may require different functionality than provided by a 2-level WRR scheduler. For example, traffic may require throughput that is allocated fairly across active leaf nodes, but such a requirement may only be provided by a 1-level WRR scheduler (e.g., rather than a 2-level WRR scheduler).

SUMMARY

According to one aspect, a method, implemented by a network device, may include: receiving, by the network device, traffic associated with a network of intermediate network devices and user devices; classifying the received traffic by the network device; allocating, by the network device, the classified traffic to traffic queues; scheduling, by the network device, particular queued traffic, provided in the traffic queues and bound for particular intermediate network devices, using a hybrid weighted round robin (WRR) scheduler, where the hybrid WRR scheduler schedules the particular queued traffic according to one of a 1-level WRR schedule, a 1.5 level WRR schedule, or a 2-level WRR schedule; and providing, by the network device, the particular queued traffic to the particular intermediate network devices based on the scheduling of the hybrid WRR scheduler.

According to another aspect, a network device may include a queuing system to: receive traffic associated with a network of intermediate network devices and user devices, classify the received traffic, allocate the classified traffic to traffic queues, and schedule particular queued traffic, provided in the traffic queues and bound for particular intermediate network devices, using a hybrid weighted round robin (WRR) scheduler that schedules the particular queued traffic according to one of a 1-level WRR schedule, a 1.5 level WRR schedule, or a 2-level WRR schedule.

According to still another aspect, one or more computer-readable media may store instructions executable by one or more processors. The media may stores one or more instructions for: receiving packet-based traffic associated with a network of network devices; classifying the received traffic; allocating the classified traffic to traffic queues; scheduling particular queued traffic, provided in the traffic queues and bound for particular network devices, using a hybrid weighted round robin (WRR) scheduler, where the hybrid WRR scheduler schedules the particular queued traffic according to one of a 1-level WRR schedule, a 1.5 level WRR schedule, or a 2-level WRR schedule; and providing the particular queued traffic to the particular network devices based on the scheduling of the hybrid WRR scheduler.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Systems and/or methods described herein may provide a hybrid WRR scheduler (e.g., a 1.5-level WRR scheduler) that includes functionality between a 1-level WRR scheduler and a 2-level WRR scheduler. The hybrid WRR scheduler may perform flat WRR scheduling across leaf nodes of a tree structure and, at the same time, may maintain per-intermediate node counters and/or control information to reflect intermediate node flow control status. In one example, in a system where intermediate nodes are reflections of intra-system objects/buffers and only leaf nodes are visible to customers (e.g., customer-facing ports), the hybrid WRR scheduler may provide flat WRR scheduling across the leaf nodes (e.g., the customer-facing leaf nodes) and may still treat intra-system intermediate nodes fairly by using the per-intermediate node counters to record the occupancy of the intra-system objects/buffers.

In an example implementation, a network device may receive traffic associated with a network of intermediate network devices and user devices (e.g., associated with customers of the network), and may parse and classify the received traffic. The network device may allocate the parsed and classified traffic to traffic queues (e.g., provided in a buffer of the network device). The network device may schedule particular queued traffic (e.g., provided in one or more of the traffic queues), bound for one or more particular intermediate network devices and/or user devices, using a hybrid (e.g., a 1.5-level) WRR scheduler. The network device may provide the particular queued traffic to the particular intermediate network devices and/or user devices based on the scheduling provided by the hybrid WRR scheduler.

The terms "component" and "device," as used herein, are intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

As used herein, the term "customer" is intended to be broadly interpreted to include a user device (e.g., a mobile telephone, a personal computer, a set-top box, a television, etc.) or a user of a user device.

Figure 1:
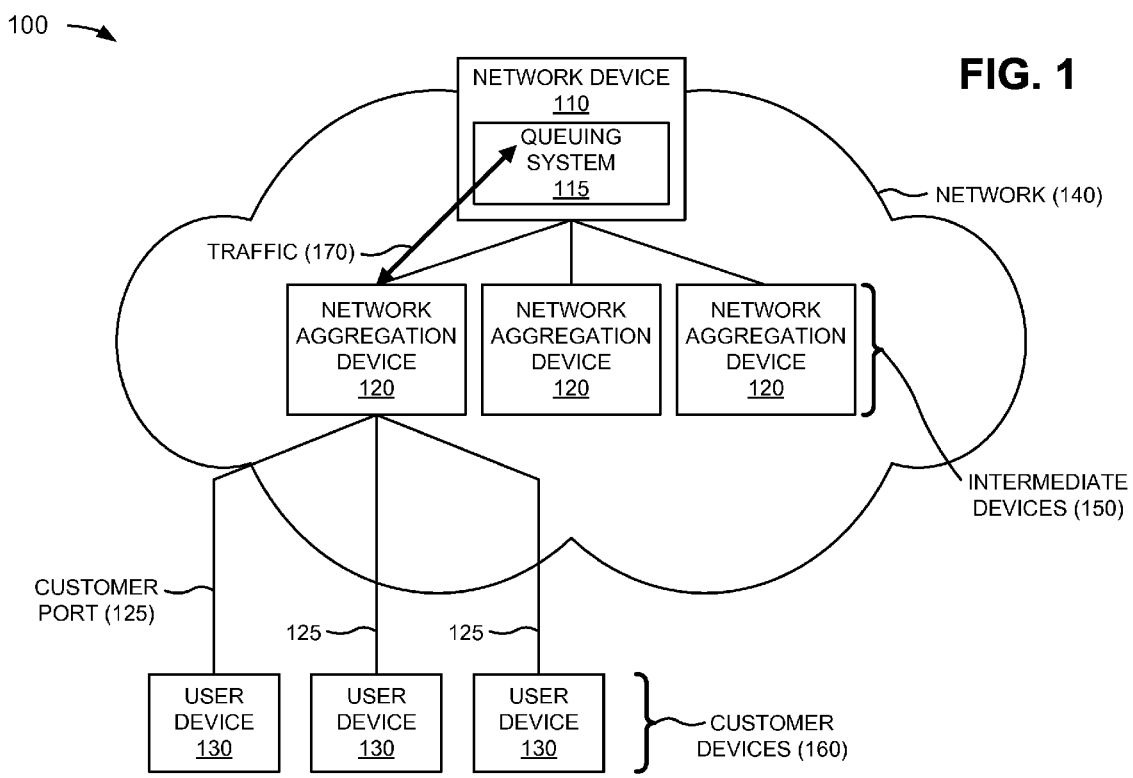
FIG. 1 is a diagram of an example network in which systems and/or methods described herein may be implemented.

FIG. 1 is a diagram of an example network in which systems and/or methods described herein may be implemented. As illustrated, network 100 may include a network device 110, a plurality of network aggregation devices 120 connected to network device 110, and a plurality of user devices 130 connected to one or more of network aggregation devices 120. As further shown in FIG. 1, network device 110 may include a queuing system 115. Network device 110 and network aggregation devices 120 may form a network 140 via which user devices 130 may communicate (e.g., packet-based traffic 170) with each other and/or other networks and/or devices (not shown). As further shown in FIG. 1, network aggregation devices 120 may collectively be referred to as intermediate devices 150 (e.g., they are intermediate to queuing system 115 and user devices 130), and user devices 130 may collectively be referred to as customer devices 160 (e.g., they are associated with customers, not shown).

Components of network 100 may interconnect via wired and/or wireless connections or links. One network device 110, three network aggregation devices 120, three user devices 130, and one network 140 have been illustrated in FIG. 1 for simplicity. In practice, there may be more network devices, 110, network aggregation devices 120, user devices 130, and/or networks 140. Also, in some instances, one or more of the components of network 100 may perform one or more tasks described as being performed by another one or more of the components of network 100.

Network device 110 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. In an example implementation, network device 110 may include a device that is capable of transmitting information to and/or receiving information from user device 130 via other network devices 110 of network 140.

In one example implementation, network device 110 (e.g., with queuing system 115) may receive traffic 170 associated with network 140 of intermediate network aggregation devices 120 (e.g., intermediate devices 150) and user devices 130 (e.g., associated with customers of network 140), and may parse and classify the received traffic 170. Network device 110 (e.g., via queuing system 115) may allocate the parsed and classified traffic to traffic queues (e.g., provided in a buffer of network device 110). Network device 110 (e.g., via queuing system 115) may schedule particular queued traffic (e.g., provided in one or more of the traffic queues), bound for one or more particular intermediate devices 150 and/or user devices 130, using a hybrid (e.g., a 1.5-level) WRR scheduler. Network device 110 (e.g., via queuing system 115) may provide the particular queued traffic to the particular intermediate devices 150 and/or user devices 130 based on the scheduling provided by the hybrid WRR scheduler.

Network aggregation device 120 may include one or more devices that are capable of multiplexing/demultiplexing traffic 170 between multiple customer ports 125 (e.g., provided between a network aggregation device 120 and user devices 130) and a link connecting network aggregation device 120 to network device 110. In one example implementation, a single physical network aggregation device 120 may act as several independent, logical network aggregation devices 120. Network aggregation device 120 may also communicate per-customer port flow control information back to network device 110.

User device 130 may include any device that is capable of communicating with one or more network aggregation devices 120 (e.g., via network 140). For example, user device 130 may include a laptop computer, a personal computer, a server device, or other types of computation or communication devices. In one example implementation, user device 130 may be associated with one or more customers (not shown).

Network 140 may include one or more networks of any type. For example, network 140 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows example components of network 100, in other implementations, network 100 may include fewer components, different components, differently arranged components, or additional components than depicted in FIG. 1.

Figure 2:
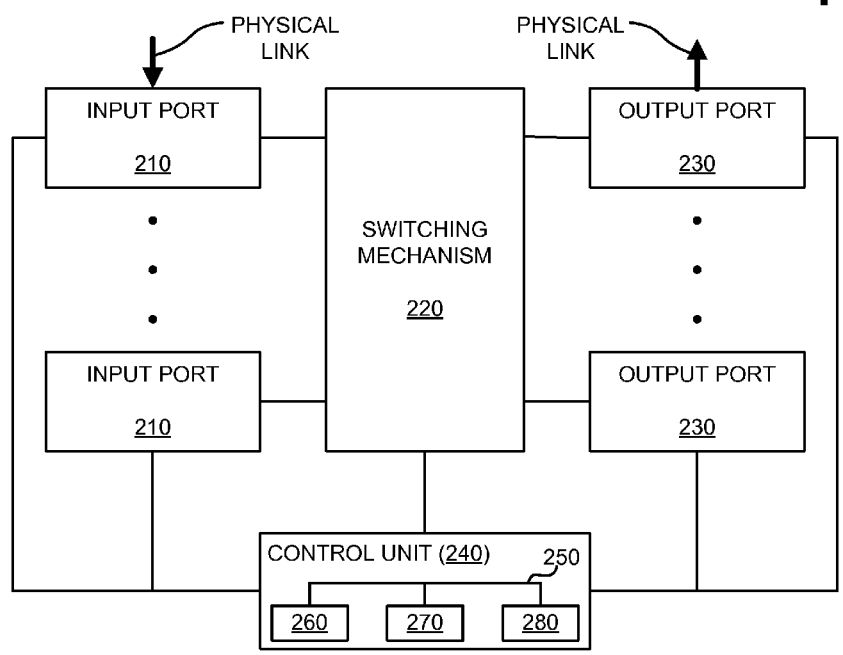
FIG. 2 is a diagram of example components of a network device depicted in FIG. 1.

FIG. 2 illustrates a diagram of example components of network device 110. As shown, network device 110 may include input ports 210, a switching mechanism 220, output ports 230, and a control unit 240.

Input ports 210 may be a point of attachment for physical links and may be a point of entry for incoming traffic (e.g., packets). Input ports 210 may carry out data link layer encapsulation and decapsulation. Input ports 210 may look up a destination address of an incoming packet in a forwarding table to determine its destination port (i.e., route lookup). In example implementations, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or with shared memories (e.g., which may act as temporary buffers to store traffic from input ports 210 before the traffic is eventually scheduled for delivery to output ports 230).

Output ports 230 may store packets and may schedule packets for service on output links (e.g., physical links). Output ports 230 may include scheduling algorithms that support priorities and guarantees. Output ports 230 may support data link layer encapsulation and decapsulation, and/or a variety of higher-level protocols. In an example implementations, output ports 230 may send packets (e.g., may be an exit point) and/or receive packets (e.g., may be an entry point).

Control unit 240 may use routing protocols and one or more forwarding tables for forwarding packets. Control unit 240 may interconnect with input ports 210, switching mechanism 220, and output ports 230. Control unit 240 may compute a forwarding table, implement routing protocols, and/or run software to configure and manage network device 110. Control unit 240 may handle any packet whose destination address may not be found in the forwarding table.

In an example implementation, control unit 240 may include a bus 250 that may include a path that permits communication among a processor 260, a memory 270, and a communication interface 280. Processor 260 may include one or more processors, microprocessors, application-specific integrated circuits (ASICs), field-programmable gate arrays (FPGAs), or other types of processing units that may interpret and execute instructions. Memory 270 may include a random access memory (RAM), a read-only memory (ROM) device, a magnetic and/or optical recording medium and its corresponding drive, and/or another type of static and/or dynamic storage device that may store information and instructions for execution by processor 260. Memory 270 may also temporarily store incoming traffic (e.g., a header of a packet or an entire packet) from input ports 210, for processing by processor 260, before a packet is directed back to the shared memories (e.g., in switching mechanism 220), queued in the shared memories (e.g., based on processing results), and eventually scheduled to be sent to output ports 230. Communication interface 280 may include any transceiver-like mechanism that enables control unit 240 to communicate with other devices and/or systems.

Network device 110 may perform certain operations, as described in detail below. Network device 110 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of network device 110, in other implementations, network device 110 may include fewer components, different components, differently arranged components, or additional components than depicted in FIG. 2. Alternatively, or additionally, one or more components of network device 110 may perform one or more other tasks described as being performed by one or more other components of network device 110.

Figure 3:
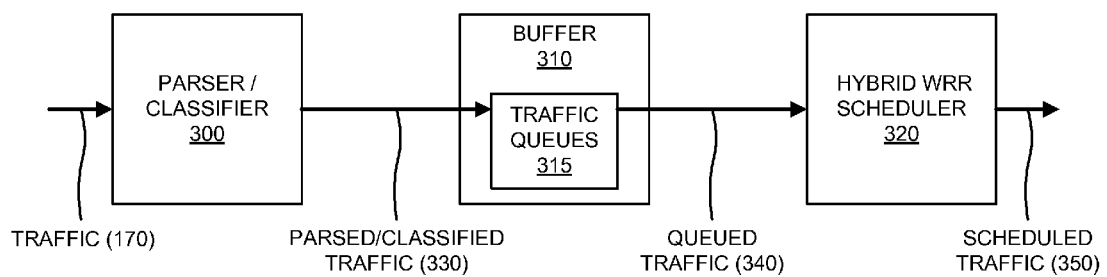
FIG. 3 is a diagram of example functional components of a queuing system of the network device.

FIG. 3 is a diagram of example functional components of queuing system 115 of network device 110. In one implementation, the functions described in connection with FIG. 3 may be performed by one or more components of network device 110 depicted in FIG. 2. As illustrated, queuing system 115 may include a parser/classifier 300, a buffer 310, and a hybrid WRR scheduler 320.

Parser/classifier 300 may include hardware or a combination of hardware and software that may receive traffic 170, and may parse traffic 170 based on information provided in packets of traffic 170. For example, parser/classifier 300 may analyze headers of the packets, and may parse traffic 170 based on the information provided by the headers of the packets. Parser/classifier 300 may classify the parsed traffic 170, and may provide parsed/classified traffic 330 to buffer 310, as shown in FIG. 3. In one implementation, parser/classifier 300 may classify the parsed traffic 170 according to traffic type (e.g., premium customer traffic, high priority traffic, etc.), traffic requirements (e.g., bandwidth requirements), etc.

Buffer 310 may include hardware or a combination of hardware and software that may provide a repository for traffic queues 315. Buffer 310 may receive parsed/classified traffic 330, and may allocate parsed/classified traffic 330 to one or more traffic queues 315. In one example, buffer 310 may allocate parsed/classified traffic 330 to traffic queues 315 based on the classifications associated with parsed/classified traffic 330. As further shown in FIG. 3, buffer 310 may provide queued traffic 340 (e.g., provided in traffic queues 315) to hybrid WRR scheduler 320. In one example implementation, hybrid WRR scheduler 320 may communicate with buffer 310, and may request queued traffic 340 (e.g., from buffer 310) based on a schedule determined by hybrid WRR scheduler 320. Buffer 310 may then provide the requested queued traffic 340 to hybrid WRR scheduler 320.

Hybrid WRR scheduler 320 may include hardware or a combination of hardware and software that may receive queued traffic 340 from buffer 310, and may schedule queued traffic 340 in accordance with a hybrid WRR scheduling process (e.g., a 1.5-level WRR scheduling process). For example, hybrid WRR scheduler 320 may perform flat WRR scheduling across leaf nodes of a tree structure and (e.g., at the same time) may maintain per-intermediate node counters.

In one example implementation, hybrid WRR scheduler 320 may determine whether particular intermediate network aggregation devices 120 (e.g., which are destinations of queued traffic 340) are flow controlled. The terms "flow control" or "flow controlled," as used herein, are intended to be broadly construed to include anything that can stop a node (e.g., intermediate network aggregation devices 120) from being dequeued, such as shaping/rate limiting at a node, running out of a downstream resource at a node, and/or a downstream resource wanting to flow control a node at a certain level. If the particular intermediate network aggregation devices 120 are flow controlled, hybrid WRR scheduler 320 may use a 2-level WRR schedule to allocate queued traffic 340. If the particular intermediate network aggregation devices 120 are not flow controlled, hybrid WRR scheduler 320 may use a flat (1-level) WRR schedule to allocate queued traffic 340.

As further shown in FIG. 3, hybrid WRR scheduler 320 may output scheduled traffic 350 based on the schedule allocated to queued traffic 340. In one example, scheduled traffic 350 may be provided to one or more intermediate devices 150 of network 140 (FIG. 1), and may eventually be provided to one or more user devices 130.

Although FIG. 3 shows example functional components of queuing system 115, in other implementations, queuing system 115 may include fewer functional components, different functional components, differently arranged functional components, or additional functional components than depicted in FIG. 3. Alternatively, or additionally, one or more functional components of queuing system 115 may perform one or more other tasks described as being performed by one or more other functional components of queuing system 115.

Figure 4:
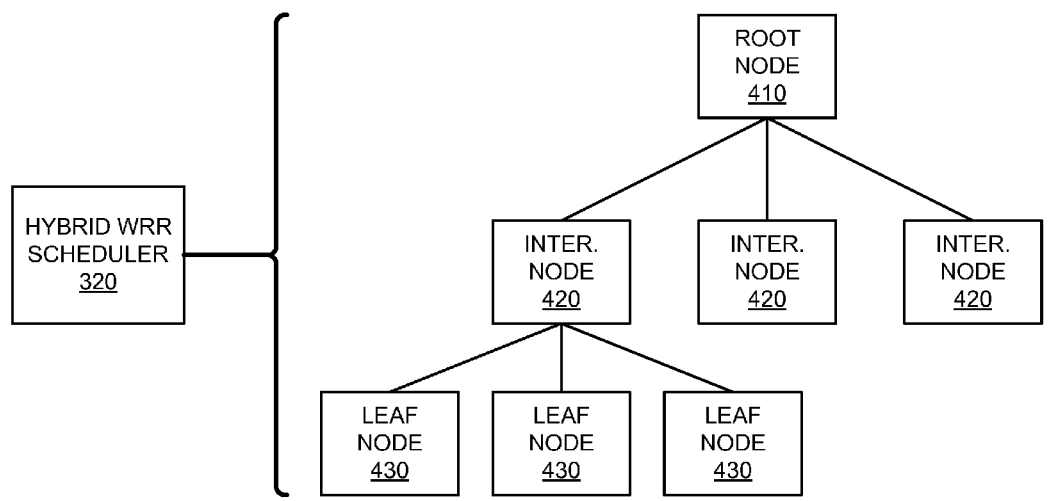
FIG. 4 is a diagram of an example tree structure capable of being generated by a hybrid WRR scheduler of the queuing system depicted in FIG. 3.

FIG. 4 is a diagram of an example tree structure 400 capable of being generated by hybrid WRR scheduler 320. In one example implementation, tree structure 400 may be used to provide a scheduling hierarchy for hybrid WRR scheduler 320. As shown in FIG. 4, tree structure 400 may include a root node 410, intermediate nodes 420, and leaf nodes 430. In one example implementation, root node 410, intermediate nodes 420, and leaf nodes 430 may provide representations (e.g., to be used by hybrid WRR scheduler 320 for scheduling purposes) of physical devices provided in a network (e.g., network 100). The representations may provide (e.g., to hybrid WRR scheduler 320) information about the physical devices (e.g., whether the devices are flow controlled, loads on the devices, capacities of the devices, etc.) that hybrid WRR scheduler 320 may utilize to schedule traffic (e.g., queued traffic 340).

For example, root node 410 may provide a representation of network device 110 (FIG. 1) in tree structure 400. Root node 410 may provide information about network device 110 that hybrid WRR scheduler 320 may utilize to schedule traffic (e.g., queued traffic 340).

Intermediate nodes 420 may provide representations of corresponding network aggregation devices 120 (FIG. 1) in tree structure 400. In one example, intermediate nodes 420 may provide information about these network aggregation devices 120 (e.g., whether network aggregation devices 120 are flow controlled, loads on network aggregation devices 120, capacities of network aggregation devices 120, etc.) that hybrid WRR scheduler 320 may utilize to schedule traffic (e.g., queued traffic 340).

Leaf nodes 430 may provide representations of corresponding customer flows (e.g., provided by user devices 130, FIG. 1) in tree structure 400. In one example, leaf nodes 430 may provide information about these customer flows (e.g., the loads provided by the customer flows on network 140, requirements of customer flows, etc.) that hybrid WRR scheduler 320 may utilize to schedule traffic (e.g., queued traffic 340).

Although FIG. 4 shows example representations of tree structure 400, in other implementations, tree structure 400 may include fewer representations, different representations, differently arranged representations, or additional representations than depicted in FIG. 4 (e.g., depending on the components and/or arrangement of network 100). Alternatively, or additionally, one or more representations of tree structure 400 may perform one or more other tasks described as being performed by one or more other representations of tree structure 400.

Figure 5:
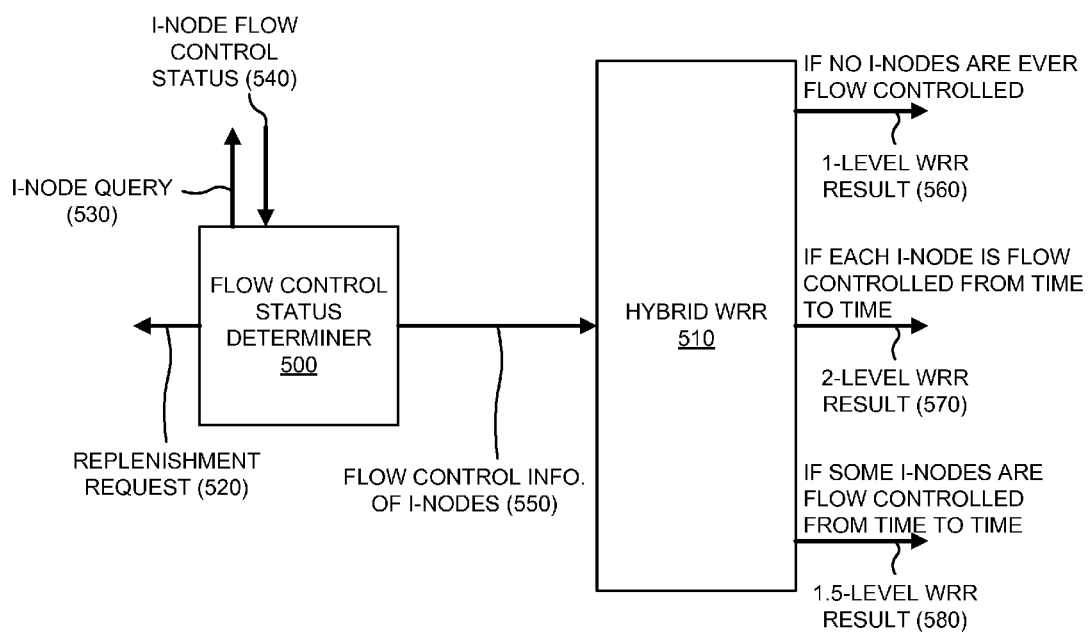
FIG. 5 is a diagram of example functional components of the hybrid WRR scheduler of FIG. 3.

FIG. 5 is a diagram of example functional components of hybrid WRR scheduler 320. In one implementation, the functions described in connection with FIG. 5 may be performed by one or more components of network device 110 depicted in FIG. 2. As illustrated, hybrid WRR scheduler 320 may include a flow control status determiner 500 and hybrid WRR component 510.

Flow control status determiner 500 may include hardware or a combination of hardware and software that may issue a replenishment request 520. For example, when each leaf node 430 (FIG. 4) is either empty or is not allowed to be dequeued (e.g., due to per leaf node 430 flow control or per intermediate node 420 flow control), hybrid WRR scheduler 320 (e.g., flow control status determiner 500) may provide replenishment request 520 to each leaf node 430. When replenishment request 520 is accepted by a particular leaf node 430, a running weight credit (e.g., associated with the particular leaf node 430) may be set to a particular value. In one example implementation, chunk size-based scheduling may be utilized to set the weight credit. For example, if the running weight credit is non-negative, then the running weight credit may be set to chunk_size×static_weight. If the running weight credit is negative, then the running weight credit may be set to chunk_size×static_weight−ABS(current_running_weight_credit). In other implementations, the running weight credit may be set according to other policies (e.g., chunk based or non-chunk based) depending on the policy of hybrid WRR scheduler 320. In one example, replenishment request 520 may not be triggered if per-root node (e.g., root node 410), or global, flow control occurs. If global flow control occurs, hybrid WRR scheduler 320 and its control structures may temporarily cease operations.

As an example of weight credits in a WRR session, assume that two nodes (e.g., node A and node B) are initially allocated weight credits of four (4) and six (6), respectively, since node A is supposed to be allocated 40% of the traffic and node B is supposed to be allocated 60% of the traffic. If traffic is allocated to both nodes, their weight credits may be reduced by a value of one (1), so that node A now has a weight credit of three (3) and node B has a weight credit of five (5). This process will continue until node A has a weight credit of zero (0) and node B has a weight credit of two (2). At this point in time, node A will not be qualified for traffic allocation, but node B will be qualified for two more traffic allocations. When node B has a weight credit of zero (0), node B will no longer be qualified for traffic allocation and hybrid WRR scheduler 320 (e.g., flow control status determiner 500) may issue replenishment request 520 to replenish the weight credits of node A and node B. After replenishment, node A and node B may once again have weight credits of four (4) and six (6), respectively.

While working on replenishment request 520, flow control status determiner 500 may scan the flow control status of all intermediate nodes 420 (FIG. 4). For example, flow control status determiner 500 may issue a query 530 (e.g., to all intermediate nodes 420 or "i-node") that requests the flow control status of intermediate nodes 420. Each of intermediate nodes 420 may respond to query 530 with their flow control status, as indicated by reference number 540. If a particular intermediate node 420 is flow controlled, replenishment request 520 may be rejected by all leaf nodes 430 that are associated with the particular intermediate node 420. Instead, leaf nodes 430 associated with the particular intermediate node 420 will keep their existing weight credit values intact. Such treatment may permit hybrid WRR scheduler 320 to retain the WRR history of all leaf nodes 430 whose parent intermediate node 420 is flow controlled. As a result, hybrid WRR scheduler 320 may maintain fairness across this subset of leaf nodes 430.

When the subset of leaf nodes 430 misses a replenishment cycle (e.g., due to their parent intermediate node 420 being flow controlled), the subset of leaf nodes 430 may have to wait for the next global replenishment cycle to have their weight credits replenishment. If a parent intermediate node 420 is freed from flow control and then uses up the running weight credits of each of its leaf nodes before the next replenishment cycle occurs, then, in this scenario, the parent intermediate node 420 and its subset of leaf nodes 430 may experience slight unfairness. However, since replenishment cycles occur very often, such unfairness may be negligible. Furthermore, slightly more intermediate node resources may be allocated (e.g., such that, during the wait time, the per-intermediate node buffer may have enough data to serve the customer ports attached to the intermediate node) so that the parent intermediate node 420 may compensate for the slight unfairness. For example, the parent intermediate node 420 may be allocated slightly more buffering (e.g., half of the bytes that are dequeued between two replenishment cycles) than what is needed for the product of the allocated intermediate node throughput and the round-trip time delay between hybrid WRR scheduler 320 and a per-intermediate node buffer.

As further shown in FIG. 5, flow control status determiner 500 may provide flow control information 550 associated with a particular intermediate node 420 to hybrid WRR component 510. If flow control status 540 of the particular intermediate node 420 indicates that the particular intermediate node 420 is not flow controlled, flow control information 550 may indicate that there is no flow control at the particular intermediate node 420. However, if flow control status 540 of the particular intermediate node 420 indicates that the particular intermediate node 420 is flow controlled, flow control information 550 may indicate that there is flow control at the particular intermediate node 420. In one implementation, flow control status determiner 500 may provide, to hybrid WRR component 510, flow control information 550 associated with all intermediate nodes 420. Such flow control information 550 may indicate that no intermediate nodes 420 are ever flow controlled, that each intermediate node 420 is flow controlled from time to time (or periodically), or that one or some of intermediate nodes 420 are flow controlled from time to time (e.g., any two given intermediate nodes, within a group of flow-controlled nodes, need not be flow controlled at the same time).

Hybrid WRR component 510 may include hardware or a combination of hardware and software that may receive flow control information 550 (e.g., associated with all intermediate nodes 420) from flow control status determiner 500, and may determine scheduling based on flow control information 550. For example, if flow control information 550 indicates that no intermediate nodes 420 are flow controlled, replenishment request 520 may be accepted by all leaf nodes 430 associated with the intermediate nodes 420, and hybrid WRR component 510 may perform 1-level WRR scheduling of traffic (e.g., queued traffic 340 (FIG. 3)). The 1-level WRR scheduling of traffic may produce a 1-level WRR result 560, as further shown in FIG. 5. 1-level WRR result 560 may include, for example, a scheduled allocation of queued traffic 340 (FIG. 3) to one or more of network aggregation devices 120 of network 100 (FIG. 1).

In another example, if flow control information 550 indicates that each intermediate node 420 is flow controlled from time to time, replenishment request 520 may be rejected by all leaf nodes 430 associated with the intermediate nodes 420 that are flow controlled at the moment of replenishment, and hybrid WRR component 510 may perform 2-level WRR scheduling of traffic (e.g., queued traffic 340 (FIG. 3)). The 2-level WRR scheduling of traffic may produce a 2-level WRR result 570, as further shown in FIG. 5. 2-level WRR result 570 may include, for example, a scheduled allocation of queued traffic 340 (FIG. 3) to one or more of network aggregation devices 120 of network 100 (FIG. 1).

In still another example, if flow control information 550 indicates that one or some of intermediate nodes 420 are flow controlled from time to time, replenishment request 520 may always be accepted by all leaf nodes 430 associated with the intermediate nodes 420 that are never flow controlled, and may be rejected by all leaf nodes 430 associated with the intermediate nodes 420 that are flow controlled at the moment of replenishment. Hybrid WRR component 510 may perform 1.5-level WRR scheduling of traffic (e.g., queued traffic 340 (FIG. 3)). The 1.5-level WRR scheduling of traffic may produce a 1.5-level WRR result 580, as further shown in FIG. 5. 1.5-level WRR result 570 may include, for example, a scheduled allocation of queued traffic 340 (FIG. 3) to one or more of network aggregation devices 120 of network 100 (FIG. 1).

Although FIG. 5 shows example functional components of hybrid WRR scheduler 320, in other implementations, hybrid WRR scheduler 320 may include fewer functional components, different functional components, differently arranged functional components, or additional functional components than depicted in FIG. 5. Alternatively, or additionally, one or more functional components of hybrid WRR scheduler 320 may perform one or more other tasks described as being performed by one or more other functional components of hybrid WRR scheduler 320.

Figure 6:
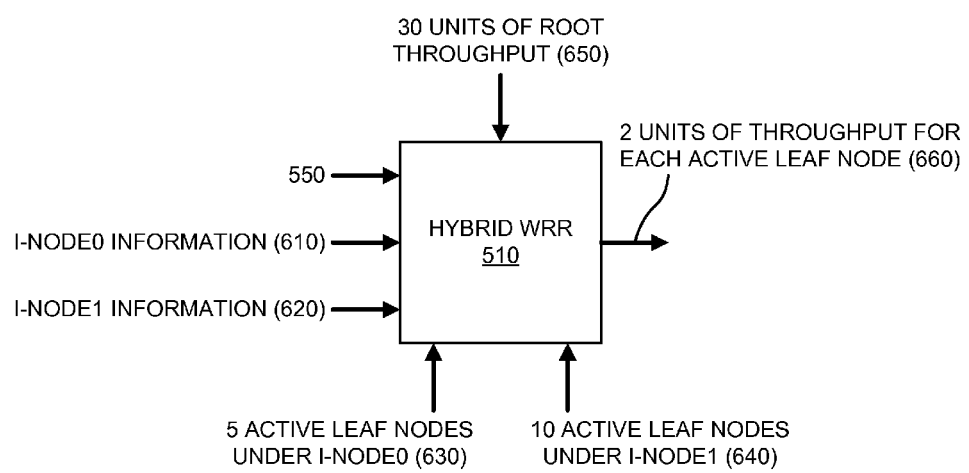
FIG. 6 is a diagram of example operations capable of being performed by a hybrid WRR component of the hybrid WRR scheduler depicted in FIG. 5.

FIG. 6 is a diagram of example operations 600 capable of being performed by hybrid WRR component 510 of hybrid WRR scheduler 320. In one implementation, the operations described in connection with FIG. 6 may be performed by one or more components of network device 110 depicted in FIG. 2. In one implementation, FIG. 6 may depict operations 600 that occur when intermediate node resources are allocated in such a way that flow control is never triggered in an intermediate node. In such a situation, hybrid WRR scheduler 320 may behave similar to a regular flat WRR scheduler.

In the example of FIG. 6, assume that there are two intermediate nodes (e.g., i-node0 and i-node1) and ten (10) leaf nodes per intermediate node. As shown in FIG. 6, hybrid WRR component 510 may receive, from time to time, flow control information 550 (e.g., which indicates that there is no flow control at intermediate nodes i-node0 and i-node1). Hybrid WRR component 510 may receive i-node0 information 610 from i-node0 and may receive i-node1 information 620 from i-node1. I-node0 information 610 may indicate that i-node0 has ten (10) leaf nodes associated with it, and that each node (e.g., each of i-node0 and its leaf nodes) has a weight of one (1). I-node1 information 620 may indicate that i-node1 has ten (10) leaf nodes associated with it, and that each node (e.g., i-node1 and each of its leaf nodes) has a weight of one (1).

As further shown in FIG. 6, hybrid WRR component 510 may receive an indication 630 that five (5) leaf nodes under i-node0 are active, and may receive another indication 640 that ten (10) leaf nodes under i-node1 are active. Hybrid WRR component 510 may receive an indication 650 that a root node has thirty (30) units (e.g., gigabits per second, megabits per second, etc.) of throughput. Based on flow control information 550, information 610, information 620, and indications 630-650, hybrid WRR component 510 may allocate two (2) units of throughput for each of the fifteen (15) active leaf nodes (e.g., 30 units÷15 active leaf nodes=2 units per active leaf node), as indicated by reference number 660. In contrast, a regular 2-level WRR scheduler, where i-node0 and i-node1 have equal weights, would provide three (3) units of throughput (e.g., 30 units are first allocated half-by-half to the two i-nodes, such that 30÷2÷5=3 units per active leaf node) for each of the five (5) active leaf nodes under i-node0, and may provide 1.5 units of throughput (e.g., 30÷2÷10 active leaf nodes=1.5 units per active leaf node) for each of the ten (10) active leaf nodes under i-node1. As can be seen, the regular 2-level WRR scheduler performs these calculations on a hop-by-hop basis and may not allocate throughput according to the expected behavior of the leaf nodes.

Although FIG. 6 shows example operations 600 capable of being performed by hybrid WRR component 510, in other implementations, hybrid WRR component 510 may perform fewer operations, different operations, or additional operations than depicted and described in connection with FIG. 6.

Figure 7:
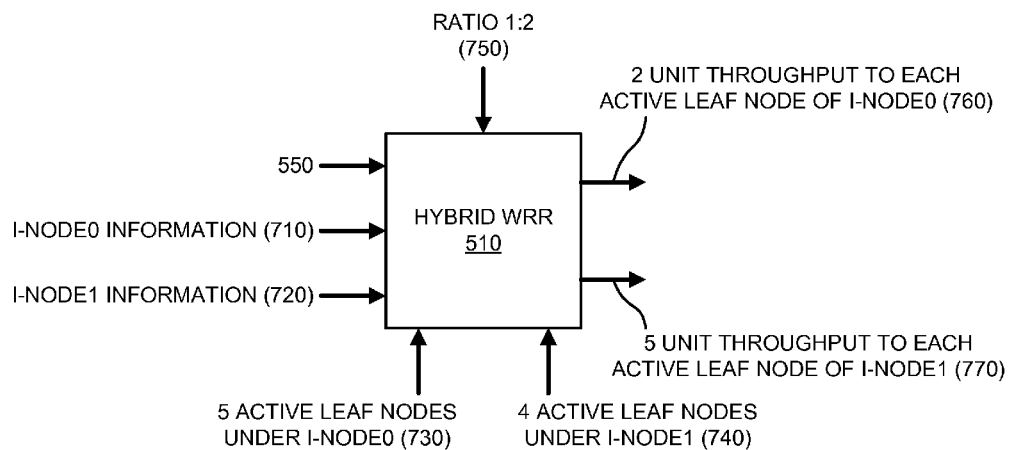
FIG. 7 is a diagram of additional example operations capable of being performed by the hybrid WRR component.

FIG. 7 is a diagram of example operations 700 capable of being performed by hybrid WRR component 510 of hybrid WRR scheduler 320. In one implementation, the operations described in connection with FIG. 7 may be performed by one or more components of network device 110 depicted in FIG. 2. In one implementation, FIG. 7 may depict operations 700 that occur when flow control occurs in all intermediate nodes. In such a situation, hybrid WRR scheduler 320 may behave similar to a 2-level WRR scheduler.

In the example of FIG. 7, assume that there are two intermediate nodes (e.g., i-node0 and i-node1) and ten (10) leaf nodes per intermediate node, and that flow control is triggered when downstream intermediate resources/buffers (e.g., physically provided within network device 110) are used up. A per-intermediate node counter may record an amount of space available in a downstream per-intermediate node buffer. Upon initialization, each counter may be set to a full capacity of a corresponding buffer. If a chunk is scheduled to an intermediate node, the corresponding counter may be charged by the chunk.

If traffic is read out from a buffer (e.g., to be sent to network aggregation device 120), the counter may be increased by the amount of traffic read out. An intermediate node may be considered to be flow controlled when the counter shows that the buffer has been fully used and/or reserved. The intermediate node may not be considered to be flow controlled when the counter shows that there is space available in the buffer. These counters may increase or decrease when traffic occurs on the corresponding intermediate nodes. Although flow control status may be directly inferred from these counters, flow control may be a result of an insufficient per-intermediate node buffer and/or insufficient throughput at a link/interface between network device 110 and the corresponding network aggregation device 120 (e.g., the link may be rate-limited or the maximum throughput of the link cannot handle what the hybrid WRR scheduler 320 can provide).

Additionally, hybrid WRR scheduler 320 may maintain a per-customer port counter (e.g., a representation of a per-customer port buffer in network aggregation device 120) that may be used to infer flow control status per leaf node. For this example, assume that a per-leaf node counter never reaches zero and thus a leaf node is never flow controlled. In may also be assumed that a per-intermediate node buffer is sized to cover a round-trip delay between hybrid WRR scheduler 320 and the per-intermediate node buffer (e.g., given a maximum throughput of hybrid WRR scheduler 320 can provide to this intermediate node). Further, it may be assumed that a root cause of the intermediate node flow control is due to insufficient allocated link throughput between network device 110 and the corresponding network aggregation device 120 (e.g., to sustain what hybrid WRR scheduler 320 can provide).

As shown in FIG. 7, hybrid WRR component 510 may receive, from time to time, flow control information 550 (e.g., which indicates that there is flow control at intermediate nodes i-node0 and i-node1). Hybrid WRR component 510 may receive i-node0 information 710 from i-node0 and may receive i-node1 information 720 from i-node1. I-node0 information 710 may indicate that i-node0 has ten (10) leaf nodes associated with it, and that each node (e.g., each of i-node0 and its leaf nodes) has a weight of one (1). I-node1 information 720 may indicate that i-node1 has ten (10) leaf nodes associated with it, and that each node (e.g., i-node1 and each of its leaf nodes) has a weight of one (1).

As further shown in FIG. 7, hybrid WRR component 510 may receive an indication 730 that five (5) leaf nodes under i-node0 are active, and may receive another indication 740 that four (4) leaf nodes under i-node1 are active. The link throughput for i-node0 and i-node1 is in a ratio of 1:2, as shown by indication 750. As mentioned above, since neither throughput is large enough to handle what hybrid WRR scheduler 320 can provide, hybrid WRR scheduler 320 may stall from time to time when i-node0 and i-node1 are flow controlled. It may be assumed that an average throughput from hybrid WRR scheduler 320 is thirty (30) units (e.g., gigabits per second, megabits per second, etc.) (i.e., the average throughput is less than the case where hybrid WRR scheduler 320 never stalls). A ratio of 1:2 may indicate that i-node0 has ten (10) units of throughput available and that i-node1 has twenty (20) units of throughput available. Based on flow control information 550, information 710, information 720, and indications 730-750, hybrid WRR component 510 may allocate two (2) units of throughput for each of the five (5) active leaf nodes (e.g., 10 units÷5 active leaf nodes=2 units per active leaf node) under i-node0, as indicated by reference number 760. Hybrid WRR component 510 may allocate five (5) units of throughput for each of the four (4) active leaf nodes (e.g., 20 units÷4 active leaf nodes=5 units per active leaf node) under i-node1, as indicated by reference number 770.

Although FIG. 7 shows example operations 700 capable of being performed by hybrid WRR component 510, in other implementations, hybrid WRR component 510 may perform fewer operations, different operations, or additional operations than depicted and described in connection with FIG. 7.

Figure 8:
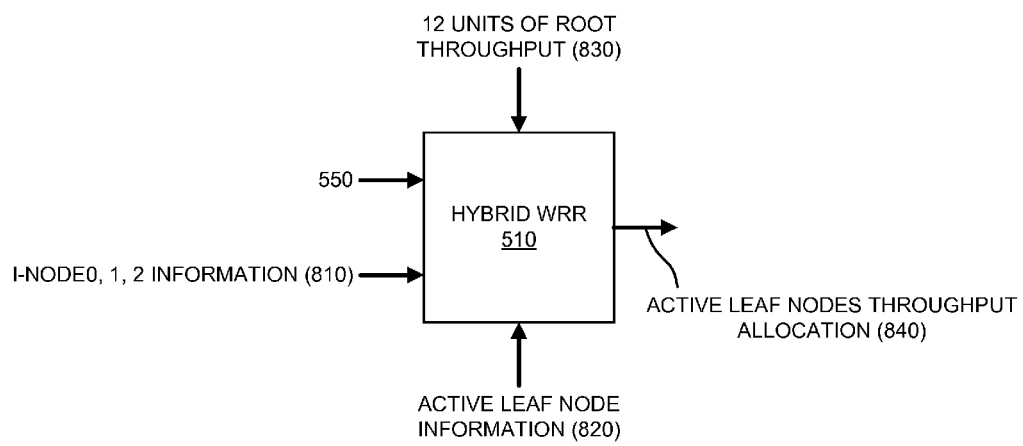
FIG. 8 is a diagram of other example operations capable of being performed by the hybrid WRR component.

FIG. 8 is a diagram of other example operations 800 capable of being performed by hybrid WRR component 510.

In one implementation, the operations described in connection with FIG. 8 may be performed by one or more components of network device 110 depicted in FIG. 2. In one implementation, FIG. 8 may depict operations 800 that occur when flow control occurs in some intermediate nodes but not in others. In such a situation, hybrid WRR scheduler 320 may behave like a 1.5-level WRR scheduler (e.g., between a 1-level WRR scheduler and a 2-level WRR scheduler).

In the example of FIG. 8, assume that there are three intermediate nodes (e.g., i-node0, i-node1, and i-node2) and ten (10) leaf nodes per intermediate node. It may also be assumed that i-node0 and i-node1 are allocated with infinite resources (e.g., so that they are never flow controlled), and that i-node2 is only allocated 20% (e.g., the link throughput is rate-limited at two units) of the resources needed to support its ten (10) leaf nodes (e.g., and may be flow controlled). As shown in FIG. 8, hybrid WRR component 510 may receive flow control information 550 (e.g., which indicates that there is flow control at intermediate node i-node2). Hybrid WRR component 510 may receive information 810 associated with i-node0, i-node1, and i-node2. Information 810 may indicate that each of i-node0, i-node1, and i-node2 has ten (10) leaf nodes associated with it, and that each node (e.g., each of i-node0, i-node1, i-node2, and their leaf nodes) has a weight of one (1).

As further shown in FIG. 8, hybrid WRR component 510 may receive active leaf node information 820. In a first example, active leaf node information 820 may indicate that all thirty (30) leaf nodes are active. In a second example, active leaf node information 820 may indicate that i-node0 has four (4) active leaf nodes, that i-node1 has six (6) active leaf nodes, and that i-node2 has ten (10) active leaf nodes. Hybrid WRR component 510 may receive an indication 830 that a root node has twelve (12) units (e.g., gigabits per second, megabits per second, etc.) of throughput. Hybrid WRR component 510 may determine that ten (10) units of throughput are to be allocated to i-node0 and i-node1, and that two (2) units of throughput are to be allocated to i-node2 (e.g., based on fewer resources being allocated to i-node2). Based on flow control information 550, information 810, active leaf node information 820, and indication 830, hybrid WRR component 510, in the first example noted above, may allocate 0.5 units of throughput for each of the twenty (20) active leaf nodes (e.g., 10 units÷20 active leaf nodes=0.5 units per active leaf node) under i-node0 and i-node1 (reference number 840). Hybrid WRR component 510 may allocate 0.2 units of throughput for each of the ten (10) active leaf nodes (e.g., 2 units÷10 active leaf nodes=0.2 units per active leaf node) under i-node2 (reference number 840).

Based on flow control information 550, information 810, active leaf node information 820, and indication 830, hybrid WRR component 510, in the second example noted above, may allocate one (1) unit of throughput for each of the ten (10) active leaf nodes (e.g., 10 units÷10 active leaf nodes=1 unit per active leaf node) under i-node0 and i-node1 (reference number 840). Hybrid WRR component 510 may allocate 0.2 units of throughput for each of the ten (10) active leaf nodes (e.g., 2 units÷10 active leaf nodes=0.2 units per active leaf node) under i-node2 (reference number 840).

Although FIG. 8 shows example operations 800 capable of being performed by hybrid WRR component 510, in other implementations, hybrid WRR component 510 may perform fewer operations, different operations, or additional operations than depicted and described in connection with FIG. 8.

As shown by the example operations depicted in FIGS. 6-8, hybrid WRR scheduler 320 may behave like a flat WRR scheduler when intermediate nodes (e.g., that are parent nodes of leaf nodes) are not flow controlled. If a particular intermediate node is flow controlled, a total throughput that the flow-controlled intermediate node can be allocated may depend upon how much resources the particular intermediate node needs to satisfy all of its active leaf nodes and may depend on the actual allocated resources. A percentage may decide the throughput. For example, if ten (10) units are needed to satisfy all active leaf nodes (i.e., each leaf node attains its full throughput permitted by a nominal speed of a corresponding customer port 125 and/or by a shaper/rate-limiter in hybrid WRR scheduler 320 or in a downstream link), that only two (2) units may be allocated. Thus, each leaf node may receive 20% of its full throughput.

In one example, the throughput of an active leaf node under a flow controlled intermediate node may be determined by its weight according to the following: (total_i-node_throughput×active_leaf_node_weight)÷total weights of all active leaf nodes under the flow controlled intermediate node. Thus, hybrid WRR scheduler 320 may provide hybrid behavior that includes regular flat WRR scheduler behavior and regular 2-level WRR scheduler behavior (e.g., 1.5-level WRR scheduler behavior).

Figure 9:
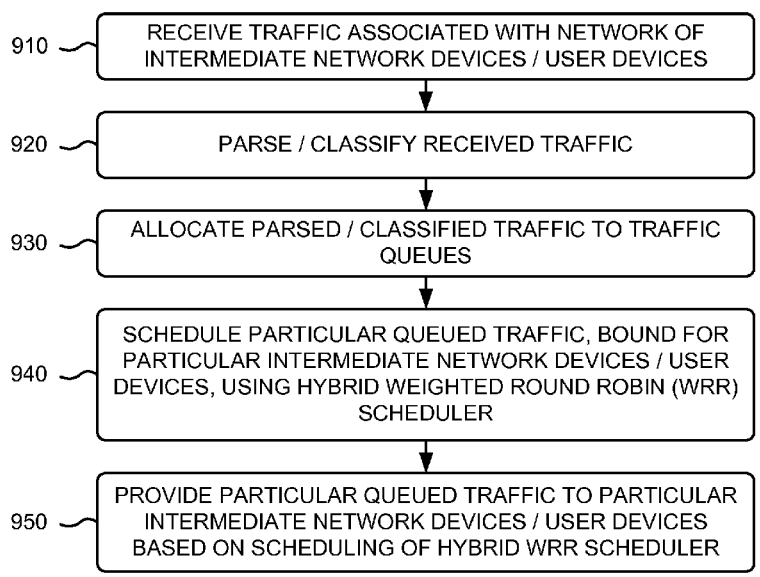
FIGS. 9-11 are flow charts of an example process for providing hybrid WRR traffic scheduling according to implementations described herein.
Figure 10:
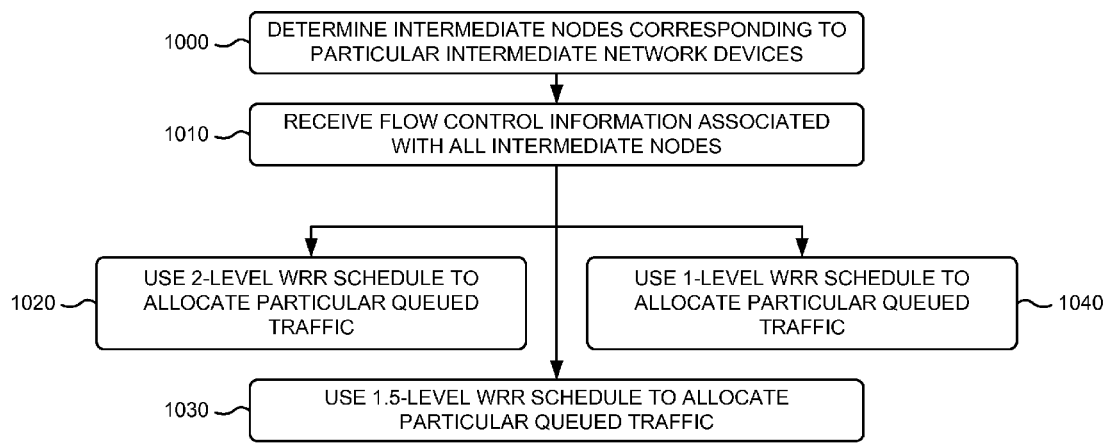
Figure 11:
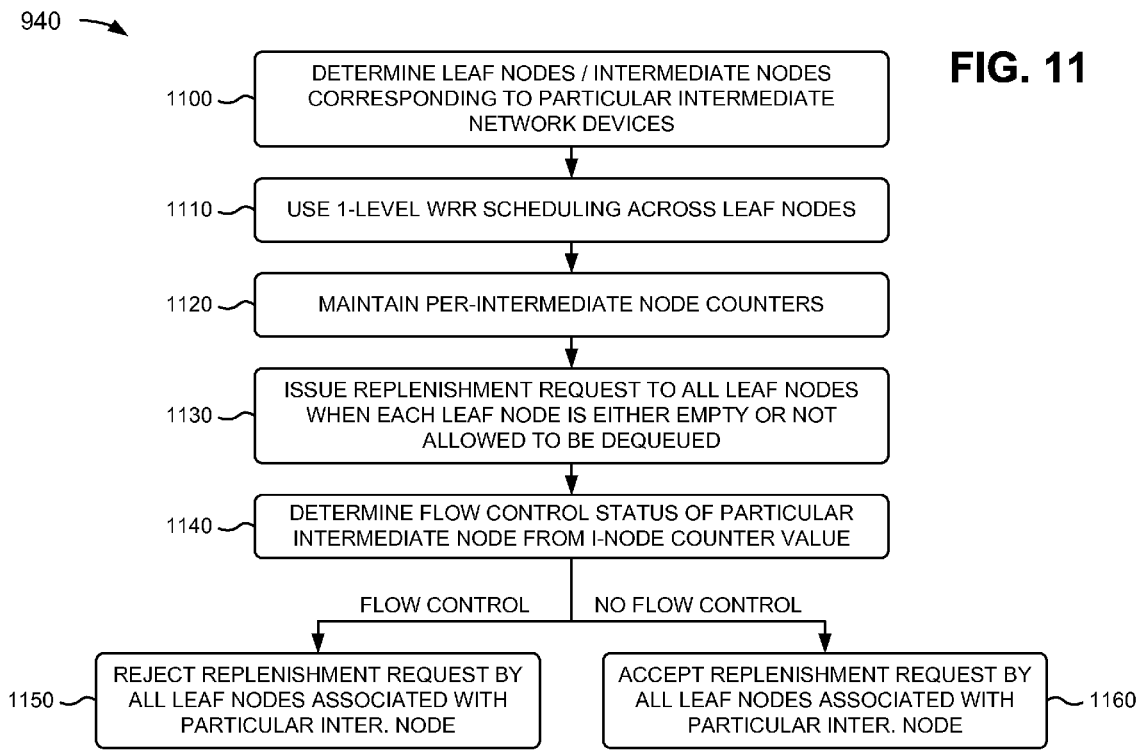

FIGS. 9-11 are flow charts of an example process 900 for providing hybrid WRR traffic scheduling according to implementations described herein. In one implementation, process 900 may be performed by network device 110 (e.g., via queuing system 115). In another implementation, some or all of process 900 may be performed by another device in conjunction with network device 110 (e.g., via queuing system 115).

As illustrated in FIG. 9, process 900 may include receiving traffic associated with a network of intermediate network devices and/or user devices (block 910), and parsing and classifying the received traffic (block 920). For example, in implementations described above in connection with FIG. 3, parser/classifier 300 of queuing system 115 (e.g., of network device 110) may receive traffic 170 (e.g., associated with network 100), and may parse traffic 170 based on information provided in packets of traffic 170. In one example, parser/classifier 300 may analyze headers of the packets, and may parse traffic 170 based on the information provided by the headers of the packets. Parser/classifier 300 may classify the parsed traffic 170 (e.g., according to traffic type (e.g., premium customer traffic, high priority traffic, etc.), traffic requirements (e.g., bandwidth requirements), etc.), and may provide parsed/classified traffic 330 to buffer 310.

As further shown in FIG. 9, process 900 may include allocating the parsed and classified traffic to traffic queues (block 930). For example, in implementations described above in connection with FIG. 3, buffer 310 of queuing system 115 (e.g., of network device 110) may provide a repository for traffic queues 315. Buffer 310 may receive parsed/classified traffic 330, and may allocate parsed/classified traffic 330 to one or more traffic queues 315. In one example, buffer 310 may allocate parsed/classified traffic 330 to traffic queues 315 based on the classifications associated with parsed/classified traffic 330. Buffer 310 may provide queued traffic 340 (e.g., provided in traffic queues 315) to hybrid WRR scheduler 320 of queuing system 115. In one example, hybrid WRR scheduler 320 may communicate with buffer 310, and may request queued traffic 340 (e.g., from buffer 310) based on a schedule determined by hybrid WRR scheduler 320. Buffer 310 may then provide the requested queued traffic 340 to hybrid WRR scheduler 320.

Returning to FIG. 9, process 900 may include scheduling particular queued traffic, bound for particular intermediate network devices and/or user devices, using a hybrid WRR scheduler (block 940), and providing the particular queued traffic to the particular intermediate network devices and/or user devices based on the scheduling of the hybrid WRR scheduler (block 950). For example, in implementations described above in connection with FIG. 3, hybrid WRR scheduler 320 may receive queued traffic 340 from buffer 310, and may schedule queued traffic 340 in accordance with a hybrid WRR scheduling process (e.g., a 1.5-level WRR scheduling process). In one example, hybrid WRR scheduler 320 may perform flat WRR scheduling across leaf nodes of a tree structure and (e.g., at the same time) may maintain per-intermediate node counters. Hybrid WRR scheduler 320 may output scheduled traffic 350 based on the schedule allocated to queued traffic 340. In one example, scheduled traffic 350 may be provided to one or more intermediate devices 150 of network 140 (FIG. 1), and may eventually be provided to one or more user devices 130.

Process block 940 may include the process blocks depicted in FIG. 10. As shown in FIG. 10, process block 940 may include determining intermediate nodes corresponding to the intermediate network devices (block 1000), and receiving flow control information for the intermediate nodes (block 1010). For example, in implementations described above in connection with FIG. 4, tree structure 400 may include root node 410, intermediate nodes 420, and leaf nodes 430. In one example, root node 410, intermediate nodes 420, and leaf nodes 430 may provide representations (e.g., to be used by hybrid WRR scheduler 320 for scheduling purposes) of physical devices provided in a network (e.g., network 100). Intermediate nodes 420 may provide representations of corresponding network aggregation devices 120 (FIG. 1) in tree structure 400. In one example, intermediate nodes 420 may provide information about these network aggregation devices 120 (e.g., whether network aggregation devices 120 are flow controlled, loads on network aggregation devices 120, capacities of network aggregation devices 120, etc.) that hybrid WRR scheduler 320 may utilize to schedule traffic (e.g., queued traffic 340).

As further shown in FIG. 10, process block 940 may, based on the flow control information, use a 2-level WRR schedule to allocate the particular queued traffic (block 1020), use a 1.5-level WRR schedule to allocate the particular queued traffic (block 1030), or use a 1-level WRR schedule to allocate the particular queued traffic (block 1040). For example, in implementations described above in connection with FIG. 5, if flow control information 550 indicates that no intermediate nodes 420 are ever flow controlled, hybrid WRR component 510 may perform 1-level WRR scheduling of traffic (e.g., queued traffic 340). The 1-level WRR scheduling of traffic may produce 1-level WRR result 560 that may include, for example, a scheduled allocation of queued traffic 340 to one or more of network aggregation devices 120 of network 100.

In another example, if flow control information 550 indicates that each intermediate node 420 is flow controlled from time to time, hybrid WRR component 510 may perform 2-level WRR scheduling of traffic (e.g., queued traffic 340). The 2-level WRR scheduling of traffic may produce 2-level WRR result 570 that may include, for example, a scheduled allocation of queued traffic 340 to one or more of network aggregation devices 120 of network 100.

In still another example, if flow control information 550 indicates that one or some of intermediate nodes 420 are flow controlled from time to time, hybrid WRR component 510 may perform 1.5-level WRR scheduling of traffic (e.g., queued traffic 340). The 1.5-level WRR scheduling of traffic may produce 1.5-level WRR result 580 that may include, for example, a scheduled allocation of queued traffic 340 to one or more of network aggregation devices 120 of network 100.

Alternatively, or additionally, process block 940 may include the process blocks depicted in FIG. 11. As shown in FIG. 11, process block 940 may include determining leaf nodes and intermediate nodes corresponding to the particular intermediate network devices (block 1100), using 1-level WRR scheduling across the leaf nodes (block 1110), and maintaining per-intermediate node counters (block 1120). For example, in implementations described above in connection with FIGS. 3 and 4, hybrid WRR scheduler 320 may perform flat WRR scheduling across leaf nodes of a tree structure and (e.g., at the same time) may maintain per-intermediate node counters. Example tree structure 400 may be generated by hybrid WRR scheduler 320. Tree structure 400 may include root node 410, intermediate nodes 420, and leaf nodes 430. In one example, root node 410, intermediate nodes 420, and leaf nodes 430 may provide representations (e.g., to be used by hybrid WRR scheduler 320 for scheduling purposes) of physical devices provided in a network (e.g., network 100).

As further shown in FIG. 11, process block 940 may include issuing a replenishment request to all leaf nodes when each leaf node is either empty or not allowed to be dequeued (block 1130). For example, in implementations described above in connection with FIG. 5, flow control status determiner 500 of hybrid WRR scheduler 320 may issue replenishment request 520. In one example, when each leaf node 430 (FIG. 4) is either empty or is not allowed to be dequeued (e.g., due to per leaf node 430 flow control or per intermediate node 420 flow control), hybrid WRR scheduler 320 (e.g., flow control status determiner 500) may provide replenishment request 520 to each leaf node 430.

Returning to FIG. 11, process block 940 may include determining a flow control status of a particular intermediate node from an intermediate node counter value (block 1140). If the particular intermediate node is flow controlled (block 1140—FLOW CONTROL), process block 940 may include rejecting the replenishment request by all leaf nodes associated with the particular intermediate node (block 1150). If the particular intermediate node is not flow controlled (block 1140—NO FLOW CONTROL), process block 940 may include accepting the replenishment request by all leaf nodes associated with the particular intermediate node (block 1160). For example, in implementations described above in connection with FIG. 5, while working on replenishment request 520, flow control status determiner 500 may scan the flow control status of all intermediate nodes 420 (FIG. 4). For example, flow control status determiner 500 may issue a query 530 (e.g., to all intermediate nodes 420 or "i-node") that requests the flow control status of intermediate nodes 420. Each of intermediate nodes 420 may respond to query 530 with their flow control status, as indicated by reference number 540. If a particular intermediate node 420 is flow controlled, replenishment request 520 may be rejected by all leaf nodes 430 that are associated with the particular intermediate node 420. If a particular intermediate node 420 is not flow controlled, replenishment request 520 may be accepted by all leaf nodes 430 that are associated with the particular intermediate node 420.

Systems and/or methods described herein may provide a hybrid WRR scheduler (e.g., a 1.5-level WRR scheduler) that includes functionality between a 1-level WRR scheduler and a 2-level WRR scheduler. The hybrid WRR scheduler may perform flat WRR scheduling across leaf nodes of a tree structure and, at the same time, may maintain per-intermediate node counters and/or control information to reflect intermediate node flow control status. In one example, in a system where intermediate nodes are reflections of intra-system objects/buffers and only leaf nodes are visible to customers (e.g., customer-facing ports), the hybrid WRR scheduler may provide flat WRR scheduling across the leaf nodes (e.g., the customer-facing leaf nodes) and may still treat intra-system intermediate nodes fairly by using the per-intermediate node counters to record the occupancy of the intra-system objects/buffers.

The foregoing description of implementations provides illustration and description, but is not intended to be exhaustive or to limit the invention to the precise form disclosed. Modifications and variations are possible in light of the above teachings or may be acquired from practice of the invention.

For example, the systems and/or methods described herein may be applied to N-level scheduling hierarchies (e.g., N>2) as well. In one implementation, the systems and/or methods may select any three consecutive levels from an N-level hierarchy and implement systems and/or methods on the three selected levels (e.g., by forcing a middle level to disappear via maintaining counters for the disappeared level(s)). In another implementation, the systems and/or methods may perform flat WRR scheduling across leaf nodes by collapsing all of the N−1 levels of intermediate nodes and by maintaining counters/status per each original intermediate node at their original intermediate levels. Then, when performing weight credit replenishment for a given leaf node, the systems and/or methods may scan each of original intermediate nodes that cover the leaf node. If any counter shows that flow control is on, then the systems and/or methods may reject the replenishment. When all related counters at all N−1 levels indicate that they are free of flow control, the systems and/or methods may accept the replenishment. By applying the systems and/or methods this way, the hierarchical scheduler design may be significantly reduced while some fairness may be maintained throughout the original intermediate hierarchical levels and improved fairness across leaf nodes can be achieved at the same time.

While series of blocks have been described with regard to FIGS. 9-11, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a network device, the method comprising:
    receiving, by the network device, traffic associated with a network;
    classifying the received traffic by the network device;
    allocating, by the network device, the classified traffic to traffic queues;
    scheduling, by the network device, particular queued traffic, provided in the traffic queues and intended for particular network devices, using a hybrid weighted round robin (WRR) scheduler,
        scheduling the particular queued traffic including:
            determining whether the particular network devices are flow controlled,
            using, when the particular network devices are not flow controlled, a 1-level WRR schedule to allocate the particular queued traffic,
            using, when a portion of the particular network devices is flow controlled, a 1.5-level WRR schedule to allocate the particular queued traffic, and
            using, when each of the particular network devices is flow controlled, a 2-level WRR schedule to allocate the particular queued traffic; and
    providing, by the network device, the particular queued traffic to the particular network devices based on scheduling the particular queued traffic using the hybrid WRR scheduler.

2. The method of claim 1, further comprising:
    parsing the received traffic prior to classifying the received traffic.

3. The method of claim 1, where the network device comprises one or more of:
    a gateway,
    a router,
    a switch,
    a firewall,
    a network interface card (NIC),
    a hub,
    a bridge,
    a proxy server, or
    an optical add-drop multiplexer (OADM).

4. The method of claim 1, where the network includes a packet-based network and the traffic includes packet-based network traffic.

5. A network device, comprising:
    one or more processors to:
        receive traffic associated with a network,
        classify the received traffic,
        allocate the classified traffic to traffic queues, and
        schedule particular queued traffic, provided in the traffic queues and intended for particular intermediate network devices, using a hybrid weighted round robin (WRR) scheduler,
            when scheduling the particular queued traffic, the one or more processors are to:
                determine leaf nodes and intermediate nodes, of a tree structure, that correspond to the particular intermediate network devices,
                use a 1-level WRR schedule with respect to the determined leaf nodes
                issue, to each of the leaf nodes, a request to replenish a weight credit associated with each of the leaf nodes when each of the leaf nodes is empty or not allowed to be dequeued, and
                determine a flow control status of a particular intermediate node of the intermediate nodes, the request being rejected by each leaf node associated with the particular intermediate node when the particular intermediate node is flow controlled.

6. The network device of claim 5, where the one or more processors are further to:
provide the particular queued traffic to the particular intermediate network devices based on scheduling the particular queued traffic using the hybrid WRR scheduler.

7. The network device of claim 5,
where, when the particular intermediate node is not flow controlled, the request is accepted by each leaf node associated with the particular intermediate node.

8. The network device of claim 5, where the network device comprises one or more of:
a gateway,
a router,
a switch,
a firewall,
a network interface card (NIC),
a hub,
a bridge,
a proxy server, or
an optical add-drop multiplexer (OADM).

9. The network device of claim 5, where the traffic includes packet-based network traffic.

10. One or more non-transitory computer-readable media storing instructions, the instructions comprising:
one or more instructions which, when executed by a device, cause the device to receive traffic associated with a network of a plurality of network devices;
one or more instructions which, when executed by the device, cause the device to classify the received traffic;
one or more instructions which, when executed by the device, cause the device to allocate the classified traffic to traffic queues;
one or more instructions which, when executed by the device, cause the device to schedule particular queued traffic, provided in the traffic queues and intended for particular network devices of the plurality of network devices, using a hybrid weighted round robin (WRR) scheduler,
the one or more instructions to schedule the particular queued traffic including:
one or more instructions to use, when the particular network devices are not flow controlled, a 1-level WRR schedule to allocate the particular queued traffic,
one or more instructions to use, when a portion of the particular network devices is flow controlled, a 1.5-level WRR schedule to allocate the particular queued traffic, and
one or more instructions to use, when each of the particular network devices is flow controlled, a 2-level WRR schedule to allocate the particular queued traffic; and one or more instructions which, when executed by the device, cause the device to provide the particular queued traffic to the particular network devices based on scheduling the particular queued traffic using the hybrid WRR scheduler.

11. The one or more non-transitory computer-readable media of claim 10, where the device comprises one or more of:
a gateway,
a router,
a switch,
a firewall,
a network interface card (NIC),
a hub,
a bridge,
a proxy server, or
an optical add-drop multiplexer (OADM).

12. The one or more non-transitory computer-readable media of claim 10, where the network includes a packet-based network and the traffic includes packet-based network traffic.

13. The one or more non-transitory computer-readable media of claim 10, the instructions further comprising:
one or more instructions to parse the received traffic prior to classifying the received traffic.

14. The one or more non-transitory computer-readable media of claim 10, the instructions further comprising:
one or more instructions to determine whether the particular network devices are flow controlled.

15. The one or more non-transitory computer-readable media of claim 14, the instructions further comprising:
one or more instructions to receive flow control information associated with the particular network devices,
the one or more instructions to determine whether the particular network devices are flow controlled include one or more instructions to determine whether the particular network devices are flow controlled based on the flow control information.

16. The method of claim 1, further comprising:
receiving flow control information associated with the particular network devices.

17. The method of claim 16, where determining whether the particular network devices are flow controlled includes determining whether the particular network devices are flow controlled based on the flow control information.

18. The network device of claim 5, where the one or more processors are further to:
maintain per-intermediate node counters stored in the network device, and
where, when determining the flow control status, the one or more processors are to determine the flow control status of the particular intermediate node based on a value of a corresponding counter of the per-intermediate node counters.

* * * * *